United States Patent
Morii

(10) Patent No.: US 6,923,287 B2
(45) Date of Patent: Aug. 2, 2005

(54) DRIVE MECHANISM FOR A SNOW VEHICLE

(75) Inventor: Hideshi Morii, Hamamatsu (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 124 days.

(21) Appl. No.: 10/352,021

(22) Filed: Jan. 28, 2003

(65) Prior Publication Data

US 2003/0164259 A1 Sep. 4, 2003

(30) Foreign Application Priority Data

Mar. 1, 2002 (JP) ........................ 2002-055816

(51) Int. Cl.⁷ .............................................. B60K 5/00
(52) U.S. Cl. ...................... 180/292; 180/182; 180/184; 180/190
(58) Field of Search ................. 180/292, 182, 180/184, 186, 190, 191, 9.1, 9.25, 9.23, 9, 9.62, 69.1, 69.24, 291; 123/196 R, 196 CP, 196 AB, 311

(56) References Cited

U.S. PATENT DOCUMENTS

| 4,917,207 | A | * | 4/1990 | Yasui et al. ................. 180/193 |
| 5,172,786 | A | * | 12/1992 | Ishibashi et al. ............ 180/190 |
| 5,279,381 | A | * | 1/1994 | Fukuda ....................... 180/190 |
| 5,372,215 | A | * | 12/1994 | Fukuda ....................... 180/190 |
| 6,454,037 | B1 | * | 9/2002 | Atsuumi et al. ............ 180/190 |
| 6,508,211 | B1 | * | 1/2003 | Asano ........................ 123/41.1 |
| 6,510,912 | B1 | * | 1/2003 | Atsuumi ..................... 180/69.1 |
| 6,547,021 | B1 | * | 4/2003 | Kai et al. .................... 180/190 |
| 6,561,297 | B2 | * | 5/2003 | Yatagai et al. .............. 180/190 |
| 6,644,261 | B2 | * | 11/2003 | Morii et al. ............. 123/195 R |
| 6,715,460 | B2 | * | 4/2004 | Ashida et al. ........... 123/196 R |
| 6,725,958 | B2 | * | 4/2004 | Ashida et al. .............. 180/186 |
| 6,745,862 | B2 | * | 6/2004 | Morii et al. ................. 180/296 |

FOREIGN PATENT DOCUMENTS

JP 11-334393 A 12/1999

* cited by examiner

Primary Examiner—J. Allen Shriver
(74) Attorney, Agent, or Firm—Nixon & Vanderhye, P.C.

(57) ABSTRACT

A drive mechanism for a snow vehicle, i.e., so-called snowmobile, includes: a four cycle engine having a cylinder head at the top thereof, arranged at the approximate center of an engine room formed in the front body of the snow vehicle; a steering post having a pair of steering bars for maneuvering the snow vehicle attached at the top end thereof, projectively arranged in the rear of the engine with respect to the vehicle's direction of travel in the engine room, with the steering side slightly inclined to the rear. In this snowmobile, a speed reducing mechanism for reducing the output speed of rotation from the engine is provided in front of the engine with respect to the vehicle's direction of travel.

15 Claims, 10 Drawing Sheets

DRIVE MECHANISM FOR A SNOW VEHICLE

BACKGROUND OF THE INVENTION (1) Field of the Invention

The present invention relates to an engine structure, in particular relating to a drive mechanism for a four-cycle engine mounted on a snow vehicle.

(2) Description of the Prior Art

Conventionally, most small snow vehicles such as snowmobiles and the like use two-cycle engines, which are relatively simple in structure, light and compact and yet powerful. Recently, however, because of regulation of exhaust gas due to environmental issues or aiming at improvement of fuel consumption, there is a trend toward employing four-cycle engines.

In contrast to two-cycle engines, which are compact, light and high in power, four-cycle engines need a camshaft and oil lubrication, inevitably tending towards large size.

Further, when a high-speed type four-cycle engine is used to secure the engine power, driven force should be transmitted using a reduction shaft, which brings with it a space problem for the disposal of the reduction shaft.

In general, when an engine is mounted on a snowmobile, it is preferred that the engine should be set as low as the steering tie-rod so that the center of gravity of the vehicle with the engine mounted is positioned at a low position to improve the maneuverability and that the engine should be set as close to the steering post as possible so that the center of gravity will be set at the center of the body.

However, when a high speed type four cycle engine is mounted for a snowmobile, an engine 202 needs to be arranged in an engine room 30 located on the front side of a snow vehicle (snowmobile) 201 and a reduction shaft, oil pump, water pump and others should be arranged on the rear side of the engine 202 (on the intake side), as shown in FIG. 1. Accordingly, if the center of gravity of the engine is attempted to be set at the center and at the lowest possible position in order to improve the maneuverability, there occurs the problem that a crankcase 205 including the reduction shaft interferes with a steering post 225 or heat exchanger 226 while an oil pan 209 and/or crankcase 205 interfere with the body bottom or a frame 10. In the drawing, 11, 13 and 28 designate a front frame, steerable ski-runner and windshield, respectively.

To solve the above problem, engine 202 should be arranged at the rear and at an upper position, in engine room 30 located on the front side of snow vehicle 201. However, since this conventional engine arrangement causes the cylinder head, designated at 204, to interfere with an engine hood 29 or headlight 31, the engine hood 29 needs to be enlarged, which produces new problems, i.e., increase in weight and degradation of maneuverability.

SUMMARY OF THE INVENTION

The present invention has been devised in view of the above problems, it is therefore an object of the present invention to provide a drive mechanism for a snowmobile which has a simple engine configuration and allows the engine to be laid out at the center of the body front and with a height as low as possible so as to improve the maneuverability.

In order to achieve the above object, the present invention is configured as follows:

In accordance with the first aspect of the present invention, a drive mechanism for a snow vehicle including: a four cycle engine having a cylinder head at the top thereof, arranged at the approximate center of an engine room formed in the front body of the snow vehicle; a steering post having a pair of steering bars for maneuvering the snow vehicle attached at the top end thereof, projectively arranged in the rear of the engine with respect to the vehicle's direction of travel in the engine room, with the steering side slightly inclined to the rear, is characterized in that a speed reducing mechanism for reducing the output speed of rotation from the engine is provided in front of the engine with respect to the vehicle's direction of travel.

In accordance with the second aspect of the present invention, the drive mechanism for a snow vehicle, having the above first feature is characterized in that a crankcase provided for the engine is adapted to be separated into upper and lower crankcases, the crankcase incorporates a balancer shaft, and the balancer shaft and the crankshaft are disposed on the abutment surface between the upper and lower crankcases.

In accordance with the third aspect of the present invention, the drive mechanism for a snow vehicle, having the above first feature is characterized in that the engine includes a water pump for circulating engine cooling water, disposed at one side portion of the crankcase, the water pump being disposed on the abutment surface between the upper and lower crankcases.

In accordance with the fourth aspect of the present invention, the drive mechanism for a snow vehicle, having the above first feature is characterized in that the speed reducing mechanism includes one or more reduction shafts for reducing the speed of rotation of the crankshaft, disposed in front of the crankshaft.

In accordance with the fifth aspect of the present invention, the drive mechanism for a snow vehicle, having the above fourth feature is characterized in that two reduction shafts are provided.

In accordance with the sixth aspect of the present invention, the drive mechanism for a snow vehicle, having the above fourth feature is characterized in that the reduction shaft or shafts are disposed on the abutment surface between the upper and lower crankcases.

In accordance with the seventh aspect of the present invention, the drive mechanism for a snow vehicle, having the above fourth feature is characterized in that the crankshaft includes a crank web whose periphery is formed with a meshing means, which transfers the output power from the crankshaft to the reduction shaft.

In accordance with the eighth aspect of the present invention, the drive mechanism for a snow vehicle, having the above fourth feature is characterized in that the crankshaft and the reduction shaft are coupled by a chain transfer means, which transfers the output power from the crankshaft to the reduction shaft.

In accordance with the ninth aspect of the present invention, the drive mechanism for a snow vehicle, having the above first feature is characterized in that the engine is a four-cycle multi-cylinder engine comprising: a cylinder block inclined to the rear; an intake path disposed on the rear side of the cylinder block; an exhaust path disposed on the front side; a magneto disposed at one end of the crankshaft; and a transfer means disposed at the other end for transferring the drive to a water pump.

In accordance with the tenth aspect of the present invention, the drive mechanism for a snow vehicle, having the above fourth feature is characterized in that the engine is a four-cycle multi-cylinder engine comprising: a cylinder block inclined to the rear; an intake path disposed on the rear side of the cylinder block; an exhaust path disposed on the front side; a magneto disposed at one end of the crankshaft; and a transfer means disposed at the other end for transferring the drive to a water pump.

DESCRIPTION OF THE PREFERRED EMBODIMENTS

The embodiments of the present invention will hereinafter be described in detail with reference to the accompanying drawings.

Figure 1:
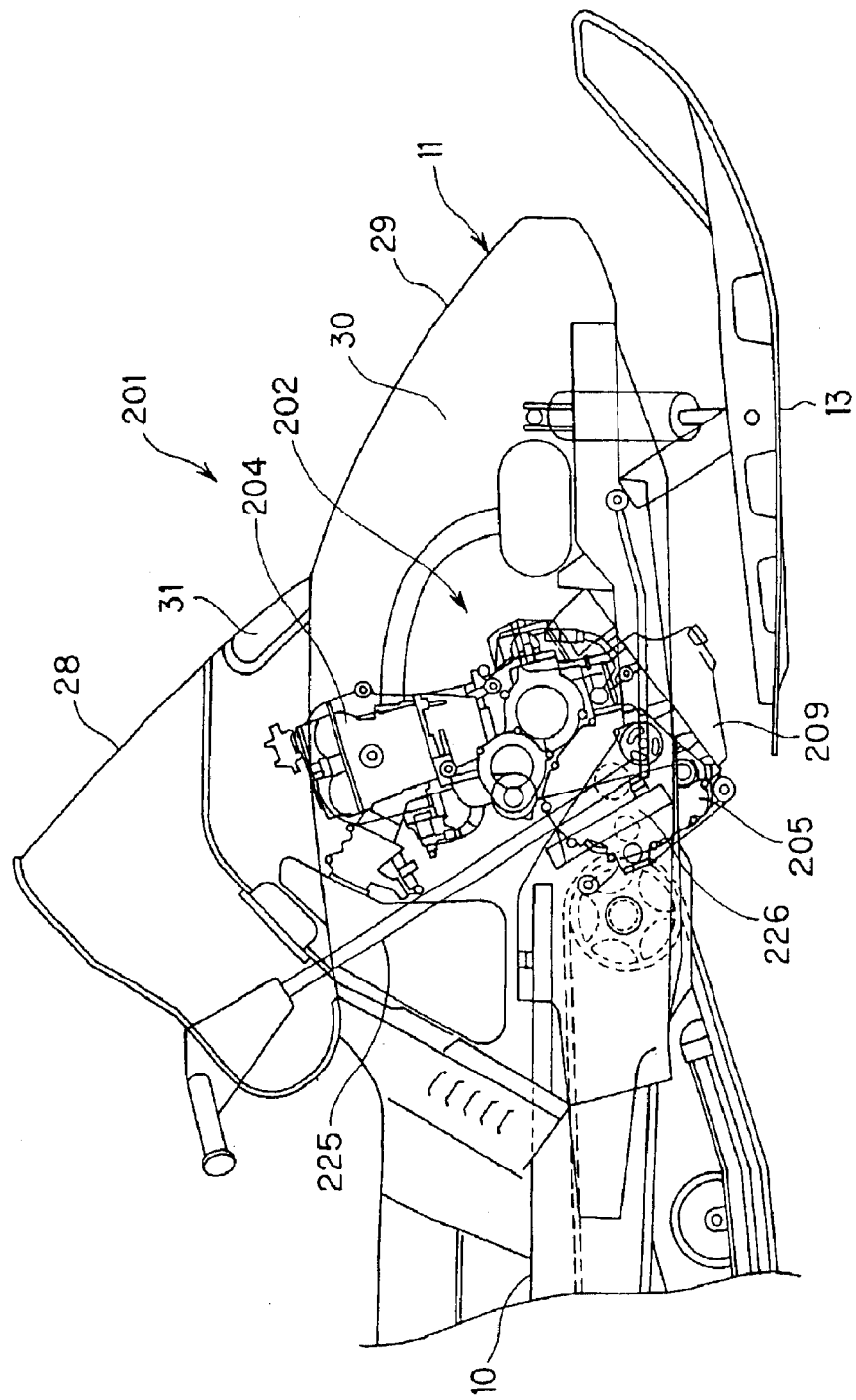
FIG. 1 is an illustrative view showing a conventional snow vehicle with an four-cycle engine mounted thereon.
Figure 2:
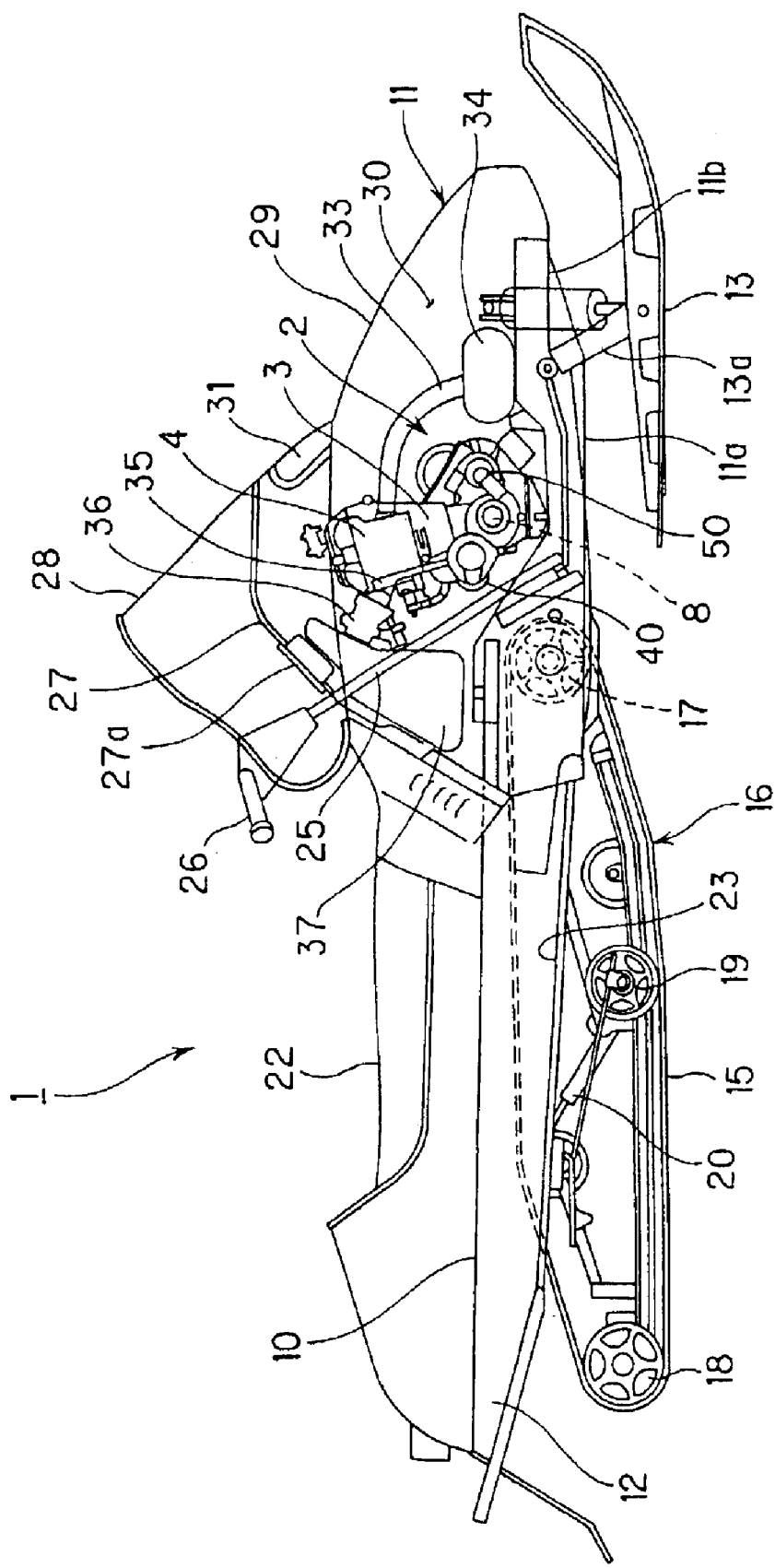
FIG. 2 is a side view showing an overall configuration of a snowmobile in accordance with the embodiment of the present invention.
Figure 3:
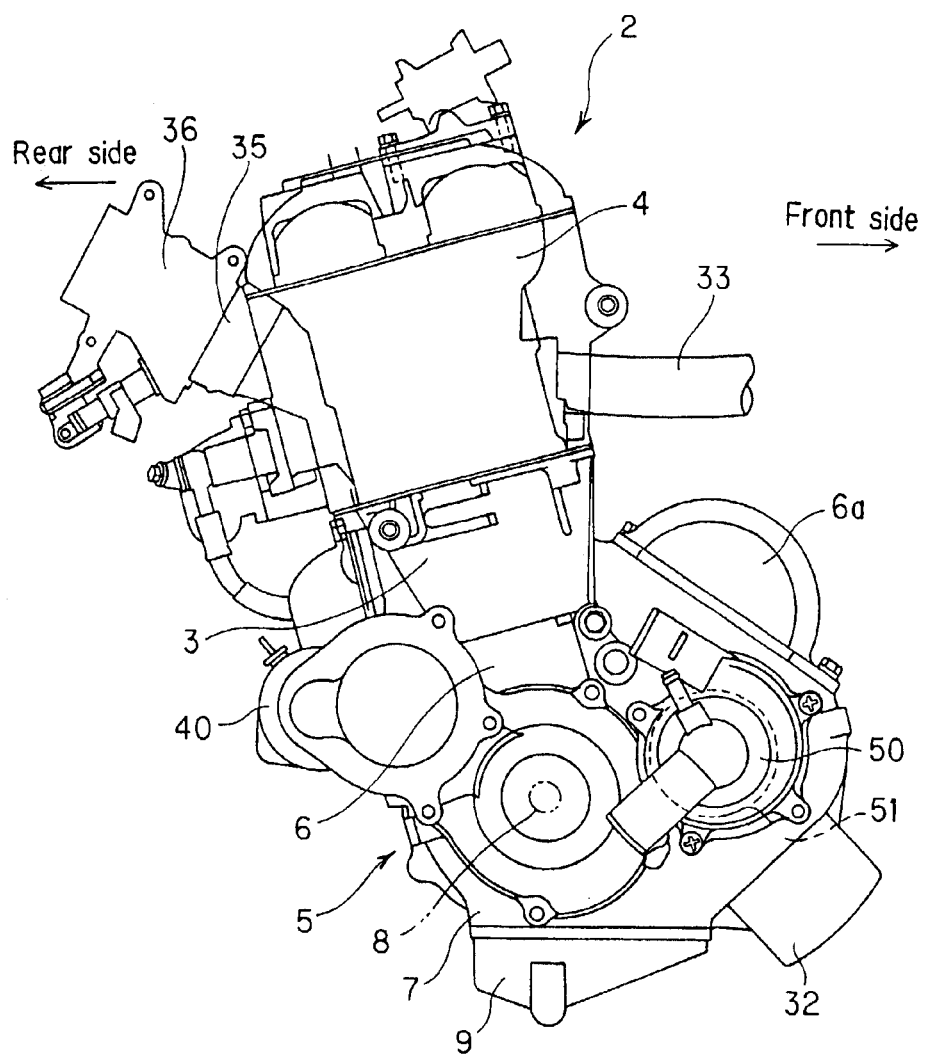
FIG. 3 is a side view from the right side, showing the configuration of an engine in accordance with the present embodiment.
Figure 4:
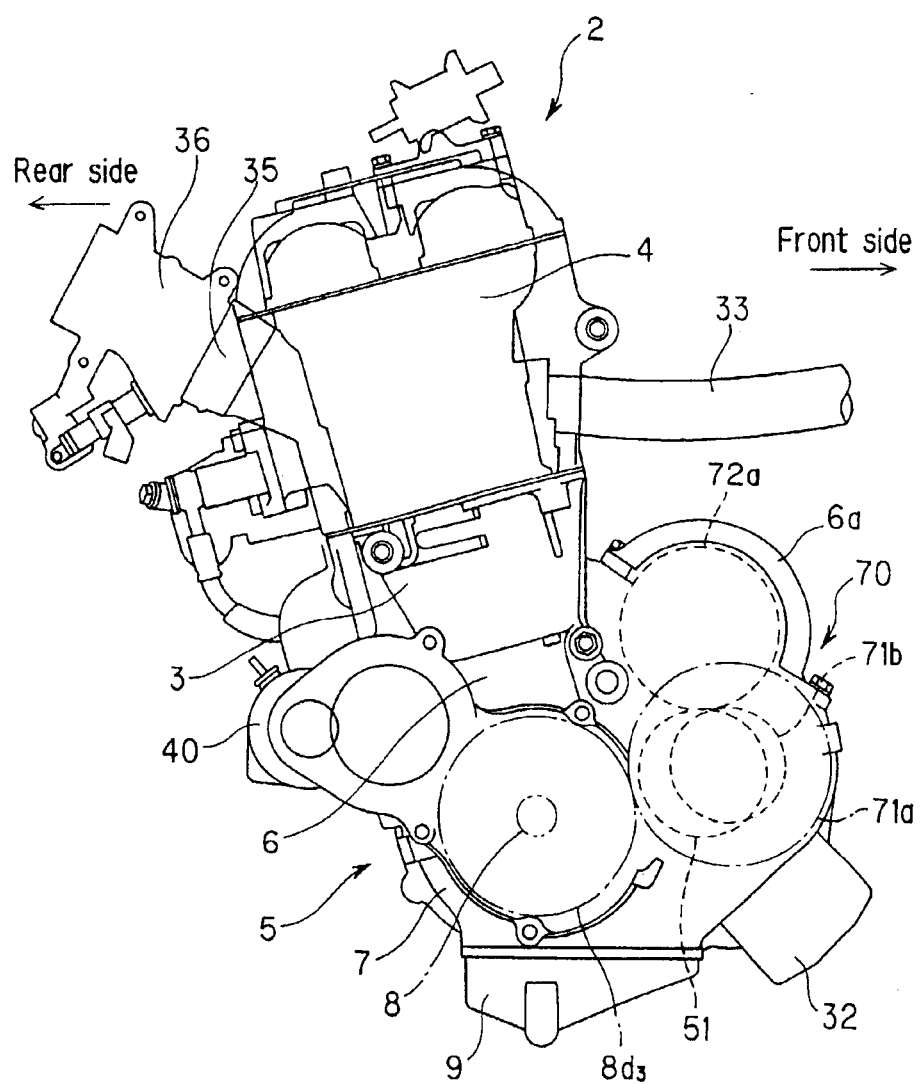
FIG. 4 is an illustrative view from the right side, showing the layout of reduction shafts of the engine.
Figure 5:
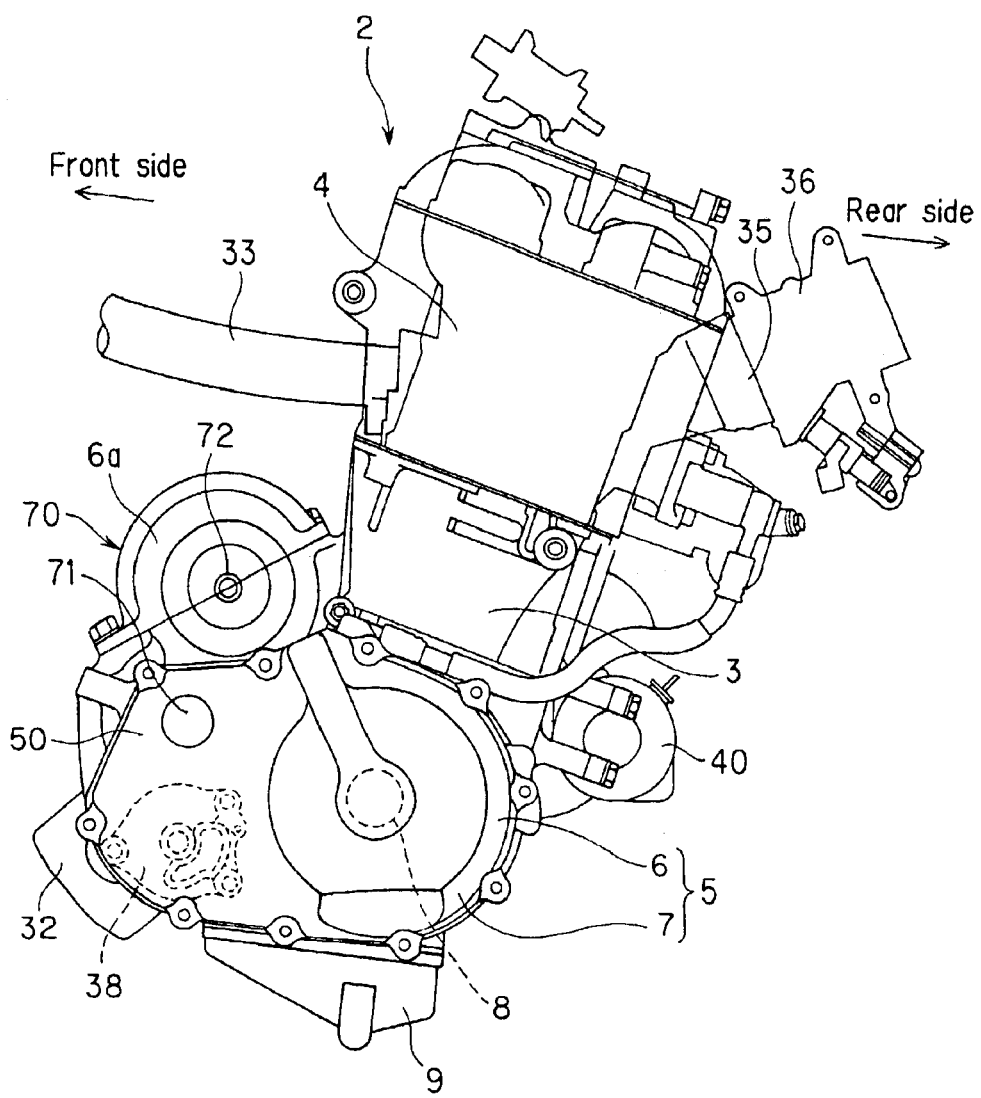
FIG. 5 is a side view from the left side, showing the configuration of the engine.
Figure 6:
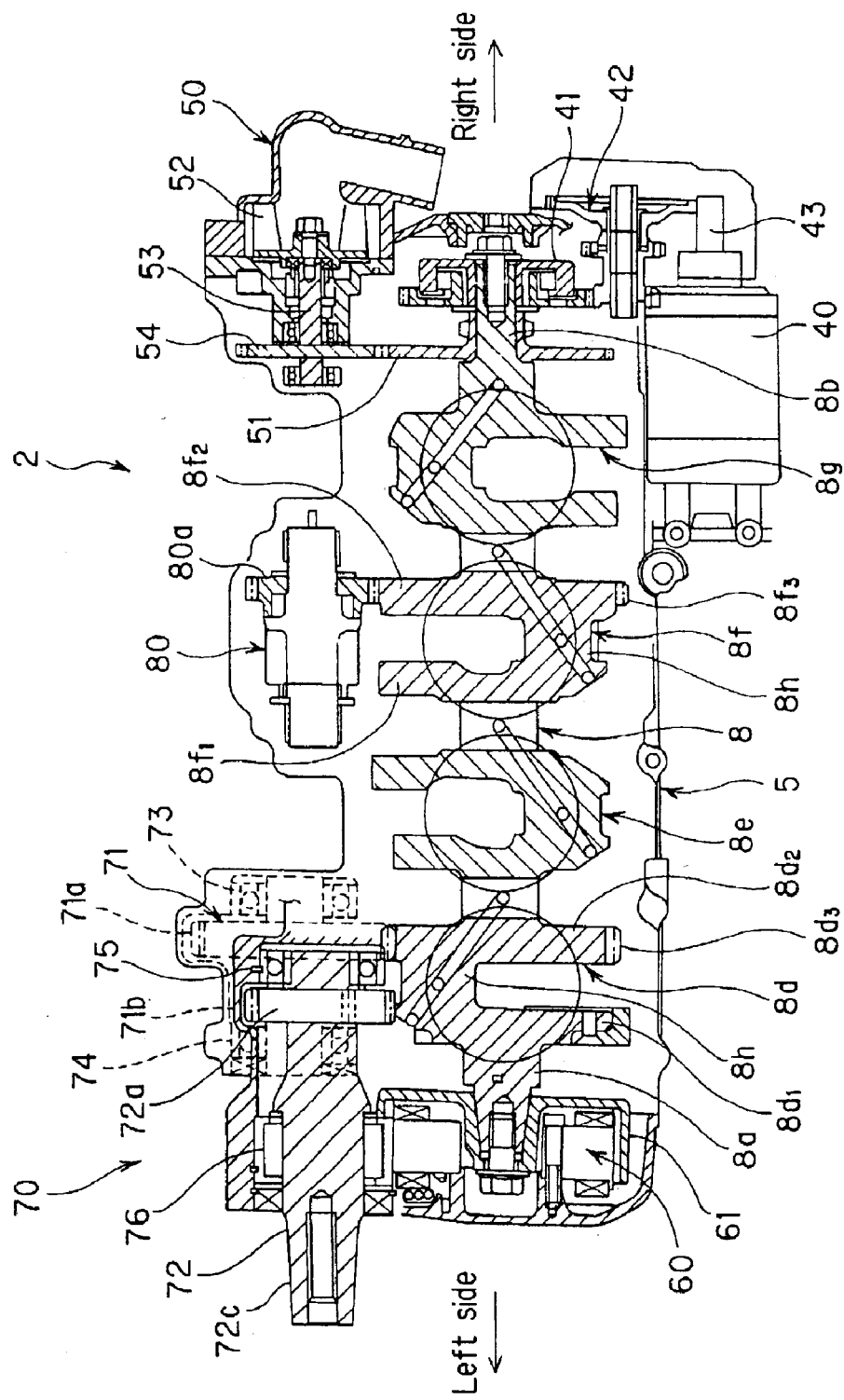
FIG. 6 is an illustrative view from top, showing a reduction shafts of the engine.
Figure 7:
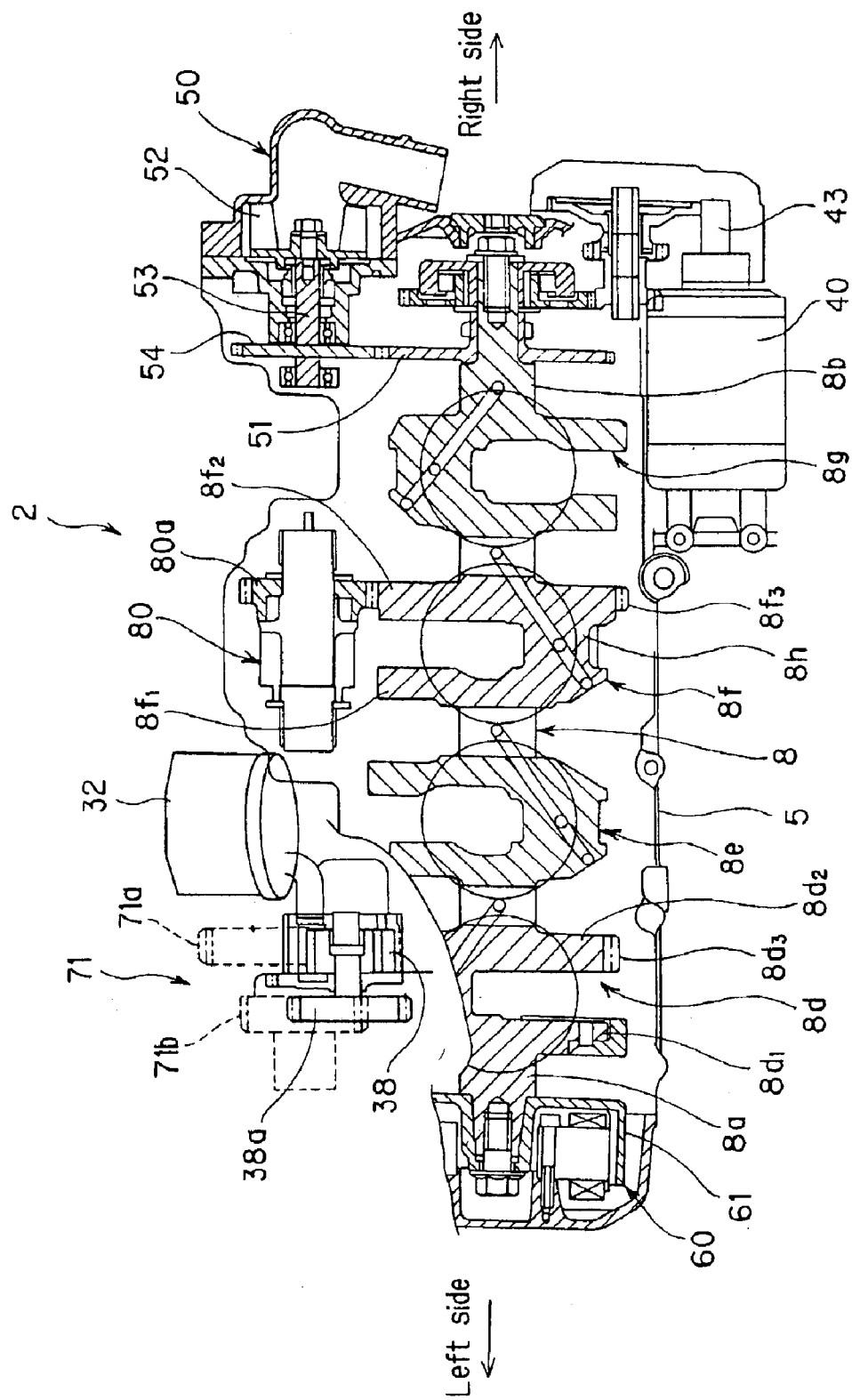
FIG. 7 is an illustrative view from top, showing the layout of the engine components.

FIGS. 2 to 6 shows one example the embodiments of the present invention. FIG. 2 is a side view showing an overall configuration of a snowmobile in accordance with the embodiment of the present invention; FIG. 3 is a side view from the right side, showing the configuration of an engine in accordance with the present embodiment; FIG. 4 is an illustrative view from the right side, showing the layout of reduction shafts of the engine; FIG. 5 is a side view from the left side, showing the configuration of the engine; FIG. 6 is an illustrative view from top, showing reduction shafts of the engine; and FIG. 7 is an illustrative view from top, showing the layout of the engine components. In the drawings, like reference numerals in the drawings represent identical components.

As shown in FIG. 2, this embodiment is an engine mounted on a small snow vehicle or a so-called snowmobile 1 with a snowmobile drive mechanism in accordance with the present invention.

The snowmobile 1 has a pair of steerable ski-runners 13, left and right, under a front frame (engine mount frame) 11 in the front body of a body frame 10 which extends in the front-to-rear direction. These steerable ski-runners 13 are rotatably mounted so that they turn left and right. Arranged under the rear frame, designated at 12, in the rear body is a tractive crawler 16 which circulates a track belt 15. This crawler 16 comprises a drive wheel 17 arranged at the front end of rear frame 12, an idle wheel 18 arranged at the rear end and a multiple number of middle wheels 19, a suspension mechanism 20 and the track belt 15 wound around these wheels and driven circulatively.

The body frame 10 has a monocoque frame configuration. The front frame 11 on which engine 2 is mounted is so shaped that the part in front of a main part 11a is raised upward forming a front suspension housing 11b for accommodating the upper part of a front suspension 13a for supporting steerable ski-type runners 13.

The rear frame 12 is extended to the rear with respect to the front-to-rear direction of the vehicle and also serves as the cover for accommodating the entire crawler 16 under it. A saddle type seat 22 is arranged on the top of rear frame 12 with steps 23 disposed at a lower level than the seat 22 on both sides of seat 22.

A steering post 25 is projectively arranged between the seat 22 and front frame 11 and in the approximate center of the body. A pair of steering bars 26 are attached at the top end of the steering post 25 so that they are slightly inclined and extended horizontally left and right.

These steering bars 26 are used to control steerable ski-runners 13 via steering post 25.

In front frame 11, an instrument panel 27 is arranged around and in front of the steering bars 26 so as to cover the top part of front frame 11. This instrument panel 27 has a speedometer/tachometer 27a and other instruments mounted thereon. A windshield 28 is provided with its upper rim tilted to the rear so that it encloses the instrument panel 27 along its front boundary from the front side to the both sides. In front of the instrument panel 27, an engine hood 29 is formed from the base of the windshield 28, in a substantially streamline shape, or in a substantially inverted, hull-bottom shape gradually lowering to the front.

The engine hood 29 is disposed in front of instrument panel 27 so that it starts at a position stepped down a degree from the front end of the instrument panel 27 toward its front end. A headlight 31 for forward illumination is arranged at the stepped portion between the engine hood 29 and instrument panel 27. In this way, an engine room 30 is formed under the thus arranged instrument panel 27 and engine hood 29.

Next, the configuration of engine 2 according to this embodiment will be described in detail.

As shown in FIG. 2, engine 2 is arranged at the approximate center of engine compartment 30 formed at a position close to the bottom part of steering post 25 in front frame 11 as the front body of snowmobile 1 with its cylinder block 3 inclined to the rear with respect to the snowmobile's direction of travel(with the center of cylinder head 4 positioned more rearwards than the crankshaft, designated at 8).

As shown in FIGS. 3 to 7, this engine 2 is a water-cooled four-cycle engine having four cylinders arranged in line in the widthwise direction, and is arranged at the approximate center in the front body of snowmobile 1 with the cylinder block 3 side tilted to the rear of the vehicle.

As shown in FIG. 3, cylinder head 4 is disposed on the upper side of cylinder block 3. An exhaust pipe 33 extended forward is provided on the front side of the cylinder head 4. The front end of the exhaust pipe 33 is coupled to a muffler 34, as shown in FIG. 2. This muffler 34 is located in the vicinity of front suspension housing 11b formed in the bottom of the main part 11a of frame front 11.

Arranged on the rear side of the cylinder head 4 and in front of steering post 25 or between the engine 2 body and steering post 25 is an intake path including an intake passage 35, throttle body 36 and air cleaner box 37.

The intake passage 35 is disposed at the side of the steering post 25 at a level higher than cylinder head 4 so that a downward current of air is supplied to the intake ports (not shown) or air is supplied by 'downdraft'.

Part of the intake path including the throttle body 36 is arranged at a level higher than cylinder head 4 inside engine room 30 and laid out in the space over engine 2, under instrument panel 27 and behind a headlight 31.

As shown in FIGS. 3 and 6, a crankcase 5 is disposed under the cylinder block 3. This crankcase 5 has a split configuration including an upper crankcase 6 which is integrally formed with the cylinder block 3 and a lower crankcase 7 with crankshaft 8 arranged therein, approximately parallel to the body width direction.

Provided on one side, with respect to the body width, of the crankcase 5, under the intake passage 35 and behind cylinder block 3, is a starter motor 40. A water pump 50 is arranged below the exhaust pipe 33 at a position approximately opposite the starter motor 40 with the cylinder block 3 in between. The starter motor 40 is arranged at a position more rearwards than crankshaft 8 while the water pump 50 is arranged at a position more frontwards than crankshaft 8, as shown in FIG. 3. A flywheel magneto 60 is disposed on the opposite side of crankcase 5.

An oil filter 32 is projectively arranged frontwards and downwards under water pump 50, on the front side of lower crankcase 7. Further, an oil pan 9 is placed under the lower crankcase 7 and close to the bottom of engine room 30.

Provided on the front side of the crankshaft 8, close to the flywheel magneto side, is a speed reducing mechanism 70. This speed reducing mechanism 70 is a drive mechanism for transferring the engine output to an unillustrated transmission device disposed on the flywheel magneto side of crankcase 5. A balancer shaft 80 is disposed on the front side of the approximate center of the crankshaft 8.

As shown in FIG. 6, a rotor portion 61 of flywheel magneto 60 is attached to one end 8a of the crankshaft 8. Integrally fixed at the other end 8b are a driven gear 41 which constantly meshes starter motor 40 by means of a gear unit 42 and a water pump drive gear 51 for driving water pump 50.

With this arrangement, rotation of starter motor 40 is transmitted to crankshaft 8 by way of gear unit 42 so as to start the engine while a fin 52 of water pump 50 starts rotating to inject cooling water into an unillustrated water jacket formed inside the engine by way of an unillustrated cooling water passage, to thereby cool the engine 2.

Provided integrally with crankshaft 8 are four crank webs 8d, 8e, 8f and 8g, which are located opposing the corresponding four cylinders arranged in cylinder block 3 and are shifted a predetermined rotational angle from one another.

The crank web 8d on the magneto side has a pair of webs 8d1 and 8d2 having a crank pin 8h in-between, and the whole periphery of web 8d2 is formed with a gear portion 8d3, which meshes the gear portion of speed reducing mechanism 70.

Crank web 8f in the central part of crankshaft 8 has a pair of webs 8f1 and 8f2 having a crank pin 8h in-between, and the whole periphery of web 8f2 is formed with a gear portion 8f3, which meshes a gear portion 80a of balancer shaft 80.

Starter motor 40 has a drive gear formed on the front end of its projected main shaft 43. This drive gear is constantly meshed by gear unit 42 with driven gear 41 that has a ratchet mechanism and is fixed on crankshaft 8, whereby rotation of starter motor 40 is transmitted to crankshaft 8 when the engine is started, as shown in FIG. 6. After the start of the engine, the drive force from the engine will not be transferred to starter motor 40 by virtue of the ratchet mechanism of driven gear 41.

As shown in FIG. 6, the water pump 50 includes fin 52 for sending cooling water to the interior, a rotary shaft 53 integrally coupled to the fin 52 and axially and rotatably supported by the crankcase side and a transmission gear 54 integrally formed with the rotary shaft 53, and is arranged so that the transmission gear 54 meshes water pump drive gear 51 on crankshaft 8.

The speed reducing mechanism 70 has two shafts, first reduction shaft 71 and second reduction shaft 72, so that the rotational direction on the output side agrees with that on the input side.

As shown in FIGS. 4, 5 and 6, the first reduction shaft 71 is disposed approximately parallel to the axial direction of crankshaft 8, and is integrally provided with a driven gear 71a meshing drive portion 8d3 of crank web 8d and a drive gear 71b for driving the second reduction gear shaft 72 and oil pump 38. Here, 38a designates an oil pump drive gear.

The first reduction shaft 71 is axially and rotatablly supported by bearings 73 and 74, arranged on the abutment surface between the upper and lower crankcases 6 and 7, on which crankshaft 8, balancer shaft 80 and water pump 50 are also attached.

As shown in FIGS. 4 and 6, the second reduction shaft 72 is disposed above the first reduction gear shaft. 71 and approximately parallel to the axial direction of the first reduction gear shaft 71, and is integrally provided with a driven gear 72a meshing drive gear 71b of the first reduction gear shaft 71.

Further, the second reduction shaft 72 is covered from above by a crankcase front cover 6a which is formed separately from upper crankcase 6, as shown in FIG. 4 and is axially and rotatably supported by bearings 75 and 76 with its one end forming an output shaft 72c, which is coupled to the transmission device side.

Next, the operation of speed reducing mechanism 70 in the engine of the present embodiment will be described.

As shown in FIG. 6, the output from crankshaft 8 during running of engine 2 is reduced in speed and transmitted from gear portion 8d3 of crank web 8d to driven gear 71a of first reduction shaft 71. At this point, the first reduction gear shaft 71 turns in an opposite direction to crankshaft 8.

The power transferred to the first reduction shaft 71 is further reduced in speed and transmitted from drive gear 71b to driven gear 72a of the second reduction shaft 72. At this point, the second reduction shaft 72 turns in an opposite direction to the first reduction shaft 71. This means that the second reduction shaft 72 rotates in the same direction as crankshaft 8.

Accordingly, the output from crankshaft 8 is further reduced in speed by first reduction shaft 71 and second reduction shaft 72 and hence further increased in torque and is transmitted to the transmission device side by output shaft 72c of second reduction shaft 72, with the direction of rotation unchanged from that of crankshaft 8.

According to the embodiment configured as above, since engine 2 is provided with speed reducing mechanism 70, the output from crankshaft 8 can be reduced in speed and increased in torque and transferred to the transmission device side by a simple arrangement even when a high-speed type engine is used as engine 2. As a result, it is possible to improve the traveling performance of the snow vehicle.

Further, according to the present embodiment, since speed reducing mechanism 70 is comprised of two shafts, i.e., first reduction shaft 71 and second reduction shaft 72, the output from engine 2 can be reduced in speed by two steps and hence increased in torque and transferred to the transmission device, while the direction of rotation is unchanged from that of crankshaft 8.

Moreover, according to the present embodiment, since power transfer to the transmission device by speed reducing mechanism 70 is achieved by the meshing of gears, it is possible to configure a simple speed reducing mechanism, which realizes a space-saving engine layout.

Still, according to the present embodiment, since speed reducing mechanism 70 is constructed so that the second reduction shaft 72 is arranged above the first reduction shaft 71, in front of cylinder block 3 and approximately parallel to the axial direction of the first reduction shaft 71, it is possible to realize a space-saving engine layout without enlargement of the engine in the front-to-rear direction and without increase in engine height.

Still more, according to the present embodiment, since gear portion 8d3 is integrally formed around the periphery of crank web 8d of crankshaft 8 so as to transfer the output power to speed reducing mechanism 70 by gear meshing, no separate transfer gear is needed, thus realizing a space-saving engine layout with simple components.

Although in the present embodiment gear drive is used for driving the reduction shafts for speed reducing mechanism 70, the present invention should not be limited to this.

Figure 8:
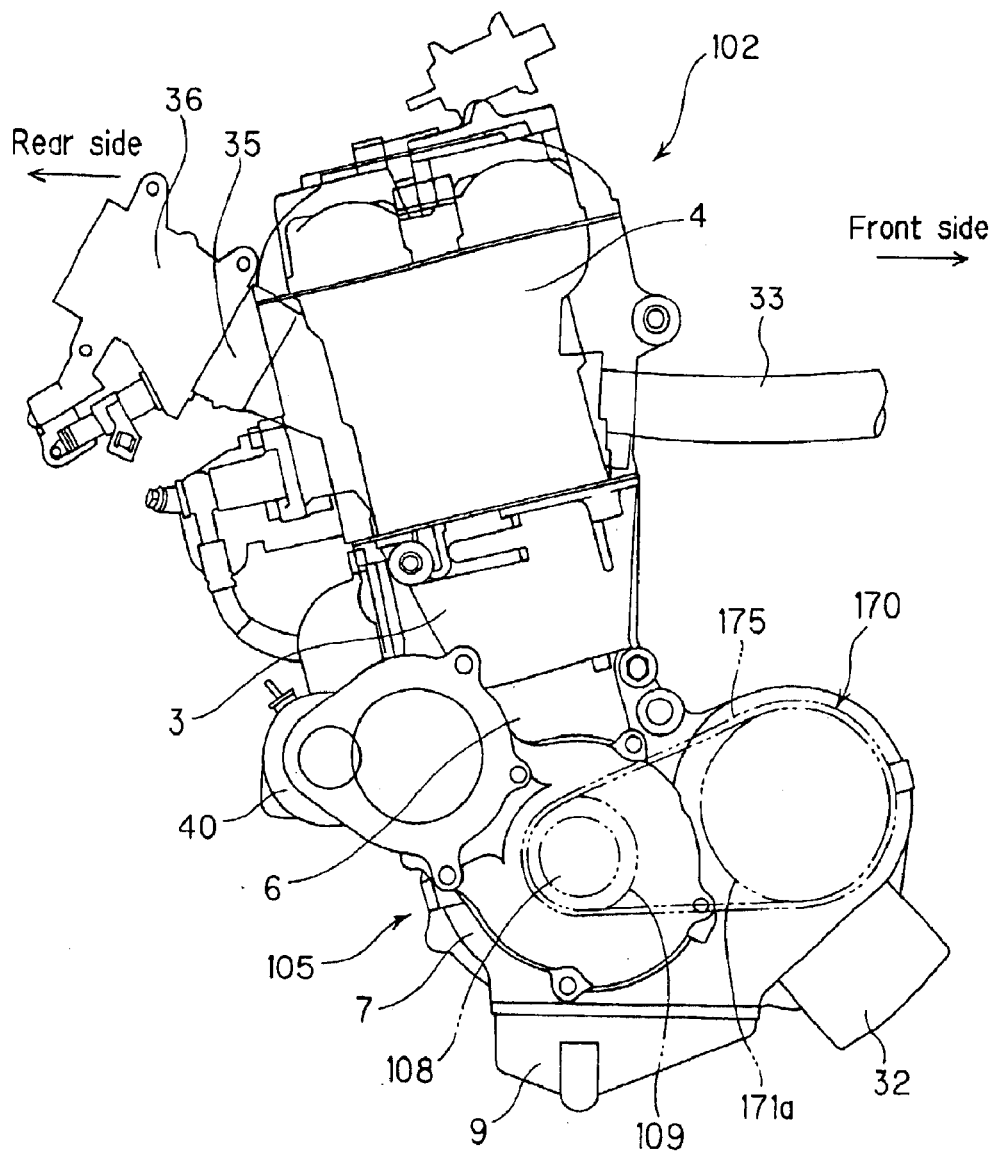
FIG. 8 is an illustrative from the right side, showing the configuration of an engine drive mechanism in accordance with a variational example of the present embodiment.
Figure 9:
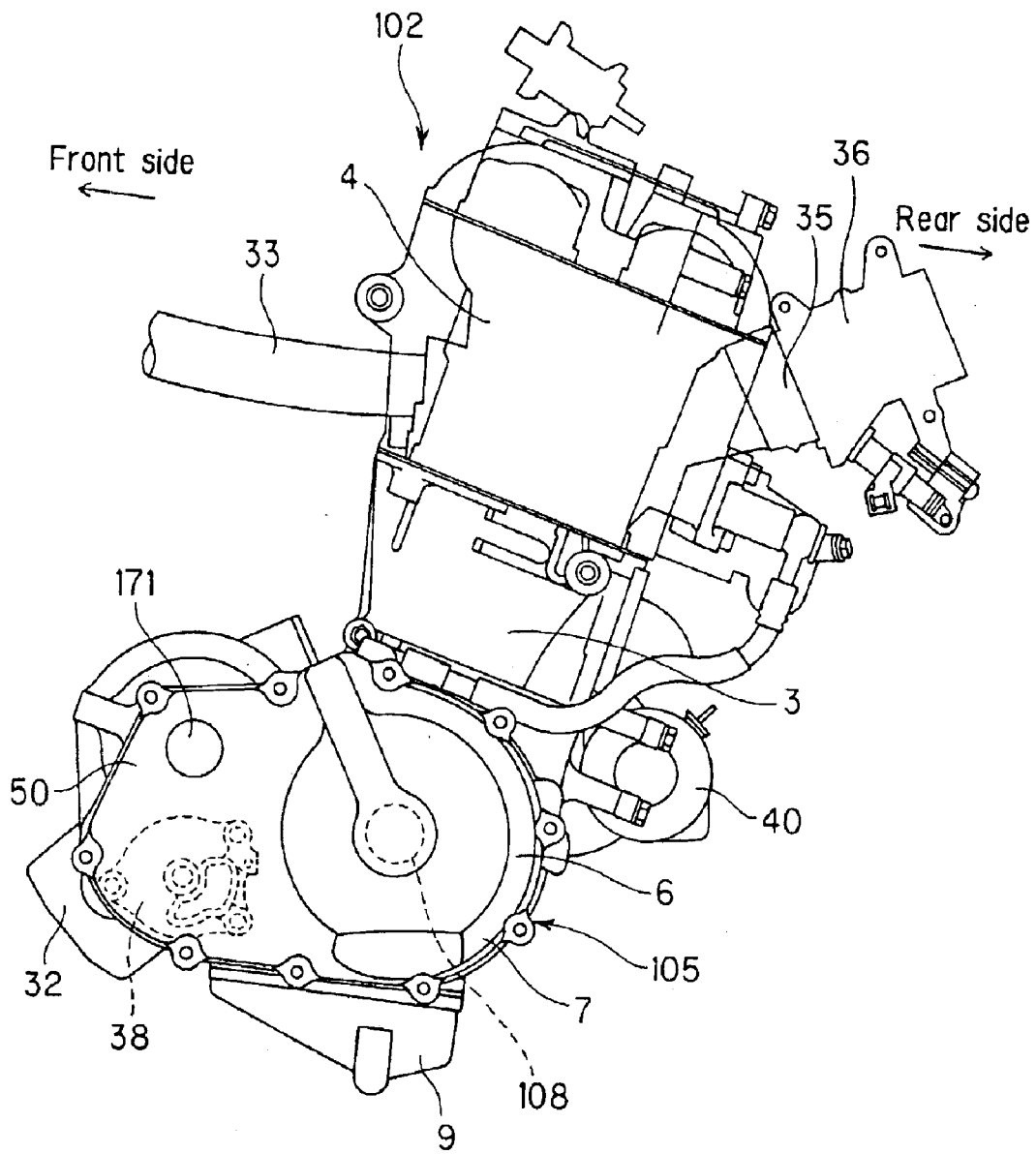
FIG. 9 is an illustrative view from the left side, showing the configuration of the drive mechanism.
Figure 10:
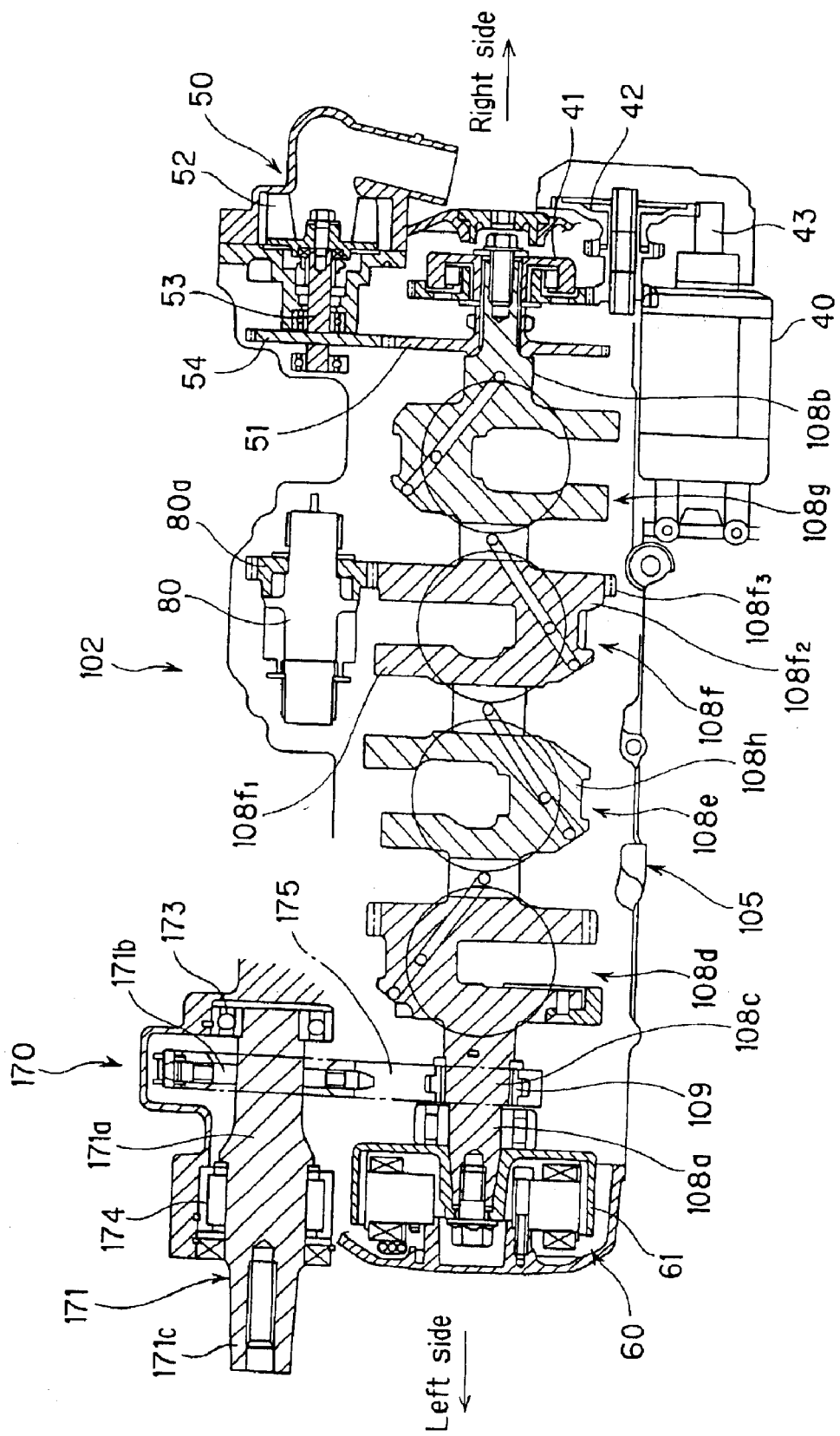
FIG. 10 is an illustrative view from top, showing the configuration of the drive mechanism.

FIGS. 8 to 10 show a variational example. In this example, a chain 175 as a chain power transfer means to couple a crankshaft 108 with a reduction shaft 171 is used for driving.

Detailedly, as shown in FIG. 10, a speed reducing mechanism 170 provided for an engine 102 is a drive mechanism for transferring the engine power to an unillustrated transmission device arranged on the flywheel magneto side of a crankcase 105, and uses chain 175 to transfer the output from a crankshaft 108 to reduction shaft 171.

Provided integrally with crankshaft 108 are four crank webs 108d, 108e, 108f and 108g, which are located opposing the corresponding four cylinders arranged in a cylinder block 3 and are shifted a predetermined rotational angle from one another. Crank web 108f in the central part has a pair of webs 108f1 and 108f2 having a crank pin 108h in-between, and the whole periphery of web 108f2 is formed with a gear portion 108f3, which meshes a gear portion 80a of a balancer shaft 80.

Balancer shaft 80 is disposed on the front side of the approximate center of the crankshaft 108. Attached to one end 108a of the crankshaft 108 is a rotor portion 61 of a flywheel magneto 60. A driven gear 41 which constantly meshes a starter motor 40 by means of a gear unit 42 and a water pump drive gear 51 for driving a water pump 50 are integrally fixed at the other end 108b.

Further, a drive sprocket 109 is integrally formed on a main shaft 108c located on the flywheel magneto side of the crankshaft 108.

The reduction shaft 171 is arranged approximately parallel to the axial direction of crankshaft 108 and has a driven sprocket 171b integrally provided with a main shaft 171a. The driven sprocket 171b is coupled with the drive sprocket 109 of the crankshaft 108 by chain 175. The reduction shaft 171 is axially and rotatably supported by bearings 173 and 174, arranged on the abutment surface between upper and lower crankcases 6 and 7, on which crankshaft 108, balancer shaft 80 and water pump 50 are also attached, and one end of the reduction shaft 171 is projected forming an output shaft 171c, which is coupled to the transmission device side.

According to the variational example thus configured, since the output power from crankshaft 108 is transferred to reduction shaft 171 by means of chain 175, it is possible to make the reduction shaft 171 rotate in the same direction as crankshaft 108 without the necessity of the second reduction shaft. Accordingly, the output from crankshaft 108 can be reduced in speed and increased in torque by a simple arrangement even when a high-speed type engine is used. Further, since no second reduction shaft is needed, a further space-saving engine layout can be realized.

Though the above description of the embodiment and variational example has been made by referring to the configurations including a four-cycle multi-cylinder engine mounted on a snowmobile, the present invention should not be limited to the engine configuration and constituents, but various changes and modifications can be added within the sprit and scope of the present invention.

As has been described heretofore, the drive mechanism for a snow vehicle of the present invention provides an excellent effect, that is, realization of a snow vehicle improved in maneuverability by providing a simple configuration of an engine which can be laid out at the center of the body front and with a height as low as possible.

Detailedly, according to the present invention, a snow vehicle including: a four cycle engine arranged at the approximate center of an engine room formed in the front body of the snowmobile; a steering post having a pair of steering bars for maneuvering the snowmobile attached at the top end thereof, projectively arranged in the rear of the engine with respect to the vehicle's direction of travel in the engine room, with the steering side slightly inclined to the rear, a speed reducing mechanism for reducing the output speed of rotation from the engine is provided in front of the engine with respect to the vehicle's direction of travel. Since this arrangement can provide an engine without increasing the engine height, the configuration avoids the engine interfering with engine peripherals and enlargement of the engine hood, and realizes a space-saving engine layout, thus making it possible to provide a snow vehicle having beneficial maneuverability.

According to the present invention, a crankcase provided for the engine is adapted to be separated into upper and lower crankcases, the crankcase incorporates a balancer shaft, and the balancer shaft and the crankshaft are disposed on the abutment surface between the upper and lower crankcases. Since this configuration makes the attachment structure for each part simple and enables assembly work to be implemented on the same face, it is possible to improve the assembly/disassembly work performance.

According to the present invention, the engine includes a water pump for circulating engine cooling water, disposed at one side portion of the crankcase, the water pump being disposed on the abutment surface between the upper and lower crankcases. Since this configuration makes the attachment structure for each part simple and enables assembly work to be implemented on the same face, it is possible to improve the assembly/disassembly work performance.

According to the present invention, the speed reducing mechanism includes one or more reduction shafts for reducing the speed of rotation of the crankshaft, disposed in front of the crankshaft. Since this configuration makes it possible to adopt a high speed type engine by a simple arrangement, it is possible to realize a snow vehicle having high travel performance.

According to the present invention, since two reduction shafts are provided, a gear type drive transfer means can be used, which enables the direction of the rotation of the crankshaft to be the same as that of the transmission device and makes it possible to provide a compact speed reducing mechanism.

According to the present invention, the reduction shaft or shafts are disposed on the abutment surface between the upper and lower crankcases. Since this configuration makes the attachment structure for each part simple and enables assembly work to be implemented on the same face, it is possible to improve the assembly/disassembly work performance.

According to the present invention, the crankshaft includes a crank web whose periphery is formed with a meshing means, which transfers the output power from the crankweb to the reduction shaft. Therefore, it is possible to transfer the output power from the crankshaft to the reducing shaft by a simple mechanism without the necessity of providing separate transfer parts.

According to the present invention, the crankshaft and the reduction shaft are coupled by a chain transfer means, which transfers the output power from the crankshaft to the reduction shaft. Therefore, this configuration enables the direction of rotation of the crankshaft to be the same as that of the transmission device, by a simple configuration without the necessity of using an even number of reduction shafts as in a gear type means.

According to the present invention, the engine is a four-cyclemulti-cylinder engine comprising: a cylinder block inclined to the rear; an intake path disposed on the rear side of the cylinder block; an exhaust path disposed on the front side; a magneto disposed at one end of the crankshaft; and a transfer means disposed at the other end for transferring the drive to a water pump. Therefore, it is possible to deal with a high-speed type water-cooled engine.

As described heretofore, the present invention has the above merits.

What is claimed is:

1. A drive mechanism for a snow vehicle including:
a four cycle multi-cylinder engine arranged at an approximate center of an engine room formed in a front body of the snow vehicle;
a steering post having a pair of steering bars for maneuvering the snow vehicle attached at a top end thereof, projectively arranged in the engine room in a rear of the engine with respect to the vehicle's direction of travel, with the steering side slightly rearwardly inclined;
an engine crankcase adapted to be separated into upper and lower crankcase, the crankcase incorporating a balancer shaft, the balancer shaft and the crankshaft deing disposed on an abutment surface between the upper and lower crankcases, and
a speed reducing mechanism for reducing output speed of rotation from the engine provided in front of the engine with respect to the vehicle's direction of travel.

2. The drive mechanism for a snow vehicle according to claim 1, wherein the engine includes a water pump for circulating engine cooling water, disposed at one side portion of the crankcase, the water pump being disposed on the abutment surface between the upper and lower crankcases.

3. The drive mechanism for a snow vehicle according to claim 1, wherein the speed reducing mechanism includes one or more reduction shafts for reducing the speed of rotation of the crankshaft, disposed in front of the crankshaft.

4. The drive mechanism for a snow vehicle according to claim 3, wherein two reduction shafts are provided.

5. The drive mechanism for a snow vehicle according to claim 3, wherein the reduction shaft or shafts are disposed on the abutment surface between the upper and lower crankcases.

6. The drive mechanism for a snow vehicle according to claim 3, wherein the crankshaft includes a crank web whose periphery is formed with a meshing means which transfers output power from the crankshaft to the reduction shaft.

7. The drive mechanism for a snow vehicle according to claim 3, wherein the crankshaft and the reduction shaft are coupled by a chain transfer means, which transfers the output power from the crankshaft to the reduction shaft.

8. The drive mechanism for a snow vehicle according to claim 3, wherein the engine is a four-cycle multi-cylinder engine comprising:
a cylinder block which is rearwardly inclined;
an intake path disposed on a rear side of the cylinder block;
an exhaust path disposed on a front side;
a magneto disposed at one end of the crankshaft; and
a transfer means disposed at an opposite end of the crankshaft for transferring the drive to a water pump.

9. A drive mechanism for a snow vehicle including:
a four cycle multi-cylinder engine arranged at an approximate center of an engine room formed in a front body of the snow vehicle;
a steering post having a pair of steering bars for maneuvering the snow vehicle attached at a top end thereof, projectively arranged in a rear of the engine with respect to the vehicle's direction of travel with a steering side slightly rearwardly inclined;
a speed reducing mechanism for reducing output speed of rotation from the engine, the speed reducing mechanism being provided in front of the engine with respect to the vehicle's direction of travel;
wherein the engine comprises:
a cylinder head at a top thereof;
a cylinder block which is rearwardly inclined;
an intake path disposed on a rear side of the cylinder block;
an exhaust path disposed on a front side of the cylinder block;
a magneto disposed at one end of the crankshaft; and
a transfer means disposed at an opposite end of the crankshaft for transferring drive to a water pump.

10. The drive mechanism for a snow vehicle according to claim 9, further comprising an engine crankcase which is adapted to be separated into upper and lower crankcases, the crankcase incorporating a balancer shaft, the balancer shaft and the crankshaft being disposed on an abutment surface between the upper and lower crankcases.

11. The drive mechanism for a snow vehicle according to claim 9, further comprising an engine crankcase which is adapted to be separated into upper and lower crankcases, wherein the water pump is disposed on the abutment surface between the upper and lower crankcases.

12. The drive mechanism for a snow vehicle according to claim 9, wherein the speed reducing mechanism includes one or more reduction shafts for reducing speed of rotation of the crankshaft, the reduction shafts being disposed in front of the crankshaft.

13. The drive mechanism for a snow vehicle according to claim 12, wherein two reduction shafts are provided.

14. The drive mechanism for a snow vehicle according to claim 12, further comprising an engine crankcase which is adapted to be separated into upper and lower crankcases, wherein the reduction shaft or shafts are disposed on an abutment surface between the upper and lower crankcases.

15. The drive mechanism for a snow vehicle according to claim 12, wherein the crankshaft includes a crank web whose periphery is formed with a meshing means which transfers output power from the crankshaft to the reduction shaft.

* * * * *